United States Patent [19]

Nakatsu et al.

[11] Patent Number: 4,835,752

[45] Date of Patent: May 30, 1989

[54] DEVICE FOR DRIVING AND CONTROLLING OPTICAL HEAD FOR USE IN OPTICAL DISK SYSTEM

[75] Inventors: Keiji Nakatsu; Shigeo Hayashi; Masaharu Ogawa; Osamu Itou; Isao Watanabe; Kunimaro Tanaka, all of Amagasaki, Japan

[73] Assignee: Mitsubishi Denki Kabushiki Kaisha, Japan

[21] Appl. No.: 132,167

[22] Filed: Dec. 14, 1987

[30] Foreign Application Priority Data

Apr. 28, 1987 [JP] Japan ................................ 62-103194

[51] Int. Cl.⁴ ...................... G11B 21/08; G11B 7/095
[52] U.S. Cl. ................................... 369/32; 360/78.04; 369/41; 369/215
[58] Field of Search ..................... 369/32, 33, 41, 215, 369/216; 360/78.04, 78.05

[56] References Cited

U.S. PATENT DOCUMENTS

| | | | |
|---|---|---|---|
| 4,498,158 | 2/1985 | Akiyama | 360/78.05 |
| 4,736,353 | 4/1988 | Kasai et al. | 369/33 |
| 4,745,587 | 5/1988 | Maeda et al. | 369/32 |
| 4,745,588 | 5/1988 | Yoshikawa et al. | 369/32 |
| 4,764,911 | 8/1988 | Moyota et al. | 369/32 |
| 4,769,800 | 9/1988 | Mosey et al. | 369/32 |
| 4,785,439 | 11/1988 | Okada et al. | 369/32 |

Primary Examiner—Steven L. Stephan
Attorney, Agent, or Firm—Leydig, Voit & Mayer

[57] ABSTRACT

A device for driving and controlling an optical head by forming a spot of a light beam on an optical disk having a plurality of tracks and detecting light from the spot reflected on the optical disk by a pair of optical detectors disposed in the head. This device has: a head actuator for moving a movable portion of the optical head in the radial direction of the disk; a speed detector for detecting the track-crossing speed of the spot from outputs from the optical detectors; a reference speed generator for generating, while accessing to a target track, a reference moving speed signal in accordance with the distance to the target track obtained from the outputs from the optical detectors, the movable head portion being moved on the basis of the reference moving speed signal so that the speed of the movable portion decreases at a position near the target track before the light beam spot reaches this track; a speed error detector for obtaining the difference between outputs from the reference speed generator and the speed detector; and a magnification change circuit adapted for amplifying the outputs from the reference speed generator and the speed detector by a predetermined multiplying factor when the distance between the light beam spot and the target track, or the crossing speed of the spot, becomes smaller than a predetermined value, the magnification change circuit also being adapted for outputting the difference obtained by the speed error detector after multiplying it by the reciprocal of the multiplying factor. The head actuator is driven on the basis of the output from the error detector so as to control the speed of the movable head portion.

8 Claims, 6 Drawing Sheets

DEVICE FOR DRIVING AND CONTROLLING OPTICAL HEAD FOR USE IN OPTICAL DISK SYSTEM

BACKGROUND OF THE INVENTION

The present invention broadly relates to an optical disk system having a head actuator adapted for driving the optical head in the radial direction of an optical disk and, more particularly, to a device for driving and controlling the optical head in such an optical disk system. Still more particularly, the present invention is concerned with a speed control circuit for conducting speed control of the head actuator during access to a track.

FIG. 1 is a block diagram of the control system in a known optical head driving and controlling device used in an optical disk system disclosed in Japanese Patent Application No. 156526/1986. Referring to FIG. 1, the optical disk system has an optical disk 1 provided with tracks in the form of concentric circles or a spiral which carry information. A light beam, which serves as an information transfer media between the optical disk 1 and an optical head 3, is denoted by 2. The optical head 3 is housed in a carriage 4 which is driven by a head actuator 5 so that it moves across the tracks on the optical disk 1. The carriage 4 is provided with a tracking actuator 6 provided with a collimator lens (not shown) which is adapted to focus the light beam 2 so as to form a spot on the track of the optical disk 1. The tracking actuator 6 is adapted to perform, after the spot of the light beam 2 has been positioned approximately on the aimed track by the operation of the head actuator, fine adjustment of the position of the spot and subsequent tracking control of the beam spot. A two-divided photo detector 7 has a pair of sensors and is adapted to convert light reflected on the optical disk 1 into electrical signals and output these signals. Each of the sensors outputs an electrical signal in response to the quantity of light in the light beam 2 introduced to the sensor. An addition circuit 8 adds the signals supplied from the two-divided photo detector 7 to each other and outputs a movement signal waveform in response to the transversal movement of the spot of the light beam 2. A subtraction circuit 9 performs subtraction between the signals supplied from the two-divided photo detector 7 so as to detect the deviation of the spot of the light beam 2 from the center of the track of the optical disk. A direction detection circuit 10 detects, on the basis of the outputs from the addition circuit 8 and the subtraction circuit 9, the direction in which the spot of the light beam moves. A speed detection circuit 11 detects, on the basis of the output signal from the subtraction circuit 9, the speed at which the spot of the light beam 2 crosses the tracks on the optical disk 1. A pulse generation circuit 12 generates a pulse from a signal supplied from the subtraction circuit 9 each time the spot of the light beam 2 crosses each track on the optical disk 1. A track counter 13 receives a signal supplied from the outside and corresponding to the number of access-tracks N, and counts and outputs the number of remaining tracks by a pulse signal supplied from the pulse generation circuit 12. A reference speed generation circuit 14 receives a signal which represents the number of remaining tracks and which is supplied from the track counter 13, first determines and stores a reference speed pattern corresponding to the number of remaining tracks, and successively outputs reference speed signals for operating the head actuator 5 in accordance with the change in the number of remaining tracks supplied from the track counter 13. A reference-speed-direction assignation circuit 15 assigns a direction D input from the outside to a reference speed signal which is output from the reference speed generation circuit 14. A speed-direction assignation circuit 16 assigns, from the output of the direction detection circuit 10, a direction of the speed of the spot of the light beam 2 detected by the speed detection circuit 11. A tracking servo pull-in command generator 17 receives the outputs from the subtraction circuit 9, the speed detection circuit 11 and the track counter 13, and outputs a position control command when the speed of the spot of the light beam 2 decreases to a predetermined speed at a predetermined track before the spot of the light beam reaches a target track. A tracking-servo circuit 18 drives the tracking actuator 6 on the basis of the outputs from the tracking servo pull-in command circuit 17 and the subtraction circuit 9 so as to control the fine adjustment in positioning the spot of the light beam 2, and the operation of following up the target track. A speed error detection circuit 19 detects the difference between the speeds determined by the reference speed signal, supplied from the reference-speed-direction assignation circuit 15, and by a moving speed signal, supped from the speed-direction assignation circuit 16 and representing the speed at which the spot of the light beam 2 moves. An amplifier circuit 20 amplifies an output signal supplied from the speed error detection circuit 19 and outputs a control signal to the head actuator 5.

FIG 2 is a diagram of input-output characteristics of a conventional circuit corresponding to the reference speed generation circuit 14. FIG. 3 is a diagram of input-output characteristics of a conventional circuit corresponding to the speed detection circuit 11. FIG. 4 is a waveform diagram both of a reference speed output $V_{REF}$ from a circuit in a conventional speed control system corresponding to the reference-speed-direction assignation circuit 15, and of a speed detection output $V_{SD}$ from a circuit corresponding to the speed-direction assignation circuit 16.

The operation of this control system will be described below. During access to one of the tracks, the carriage 4, incorporating the optical head 3, is moved by the head actuator 5 so that it crosses the tracks on the opticals disk 1. A signal N supplied from the outside, and corresponding to the number of access-tracks is input into the track counter 13. When, during track-accessing, the spot of the light beam 2 crosses the tracks on the optical disk 1, electrical signals which correspond to this crossing movement are output from the sensors of the two-divided photo detector 7. These output signals are input into the addition circuit 8 and the subtraction circuit 9, thereby respectively obtaining summation signals, namely, REF signals (total reflection quantity signals) and differential signals, namely, tracking signals. The pulse generation circuit 12 generates pulses on the basis of a signal supplied from the subtraction circuit 9 in such a manner that it generates a pulse, for example, at a zero point of this signal at which each cycle of the signal starts. The thus generated pulses that represent the extent to which the spot of the light beam 2 has crossed the tracks are output to the track counter 13. The track counter 13 receives the pulse signal from the pulse generation circuit 12 and successively subtracts corresponding values from the number of access-tracks N first supplied from the outside, and outputs signals each of which represents the number of remaining tracks. The reference speed generation circuit 14 receives the output from the track counter 13, and determines and outputs a reference speed pattern signal in accordance with the number $N_A$ of remaining tracks (residual tracks) on the basis of the input-output characteristics shown in FIG 2. The reference-speed-direction assignation circuit 15 assigns to the output from the reference speed generation circuit 14 a reference-speed-direction command D which specifies the direction of the movement of the head actuator 5 and which has been input from the outside, thereby outputting a reference speed. The direction detection circuit 10 receives the output from the addition circuit 8, namely, the REF signal and the output from the subtraction circuit 9, namely, the tracking signal, and detects, from the phases of these signal waveforms, the direction in which the spot of the light beam 2 moves. The speed detection circuit 11 receives the output from the subtraction circuit 9 (tracking signal), detects the tracking signal cycle, converts it into a speed at which the spot of the light beam 2 moves across the track on the optical disk 1 in accordance with the characteristic shown in FIG. 3 (into a value in proportion to the reciprocal number of the period), and thereafter outputs this speed. The speed-direction assignation circuit 16 receives a speed signal output from the speed detection circuit 11 and a direction signal output from the direction detection circuit 10, and outputs a beam-spot-speed detection signal with a selected direction. A reference speed output from the reference-speed-direction assignation circuit 15 and the beam-spot-speed detection signal from the speed-direction assignation circuit 16 are then input into the speed error detection circuit 19 and are compared with each other therein. A differential signal thereby obtained is amplified by the amplifier circuit 20. The head actuator 5 is driven on the basis of the output from the amplifier circuit 20 so as to control the speed at which the carriage 4 is moved and, hence, the speed at which the spot of the beam 2 is moved. As shown in FIG. 4, as the spot of the light beam 2 approaches the target track, the speed at which the spot of the light beam 2 moves decreases by the control of the operation of driving the head actuator 5. The tracking servo pull-in command generator 17 receives output signals supplied from the subtraction circuit 9, the speed detection circuit 11 and the track counter 13, and outputs a position control command signal if the speed becomes lower than a predetermined value when the spot of the light beam reaches a predetermined track, for example, the track adjacent to the target track before the beam spot reaches the target track. The tracking-servo circuit 18 receives the output from the tracking servo pull-in command generator 17 and the output from the subtraction circuit 9 (tracking signal), and controls the tracking actuator 6 in the vicinity of the zero point of the tracking signal, thereafter proceeding to a positional control mode. That is, the light spot can be positioned at the target track.

If, in the thus constructed device for driving and controlling the optical head, some offsets occur in the electrical circuits including the speed detection circuit 11, the reference speed generation circuit 14, the reference-speed-direction assignation circuit 15, the speed-direction assignation circuit 16, the speed error detection circuit 19 and the amplifier circuit 20, this would affect the control of the operation of driving the head actuator 5, as indicated by the broken line in FIG. 4, and reduce the accuracy of the control. This is because the signal levels of the speed detection output and the reference speed output are small as the speed of the light spot is low immediately before pull-in, namely, the operation of positioning the spot at the target track. Therefore, there is a possibility of a reduction in the accuracy of the drive control by the head actuator 5 due to circuit-system offsets and, hence, a possibility of the tracking-servo circuit 18 failing to perform the pull-in operation at the target track, resulting in increase in the access time.

SUMMARY OF THE INVENTION

The present invention has been achieved with a view to overcoming these problems. An object of the present invention is to provide an optical head driving and controlling device which is capable of suitably controlling the head actuator and ensuring a stable pull-in operation of the tracking-servo circuit at the target track even when the degree of offset of a electrical circuit of the control system is high.

To this end, the present invention provides an optical head driving and controlling device having a circuit in which a reference speed output, indicative of a reference speed, and a speed detection output indicative of a transfer speed of the beam spot, are multiplied by C (C>1) when, while accessing a target track, the distance between the light beam spot and the target track or the speed at which the spot moves (the speed of the carriage accommodating the optical head) becomes smaller than a predetermined value. A value output from an error detection circuit and representing the difference between the reference speed output and the speed detection output is multiplied by 1/C, thereby enabling the speed deviation due to an offset of the circuit system to be reduced by 1/C while maintaining the total loop gain of the circuit system.

In the device for driving and controlling the optical head in accordance with the present invention, the reference speed output and the speed detection output are simultaneously multiplied by C (C>1) when, while accessing a target track, the number of remaining tracks or the speed of the light beam spot transverse motion (the speed of the carriage accommodating the optical head) has become smaller than a predetermined value. It is therefore possible to improve the performance of driving and controlling the head actuator by reducing the effects of an offset in a subsequent circuit to 1/C.

DESCRIPTION OF PREFERRED EMBODIMENT

Figure 1:
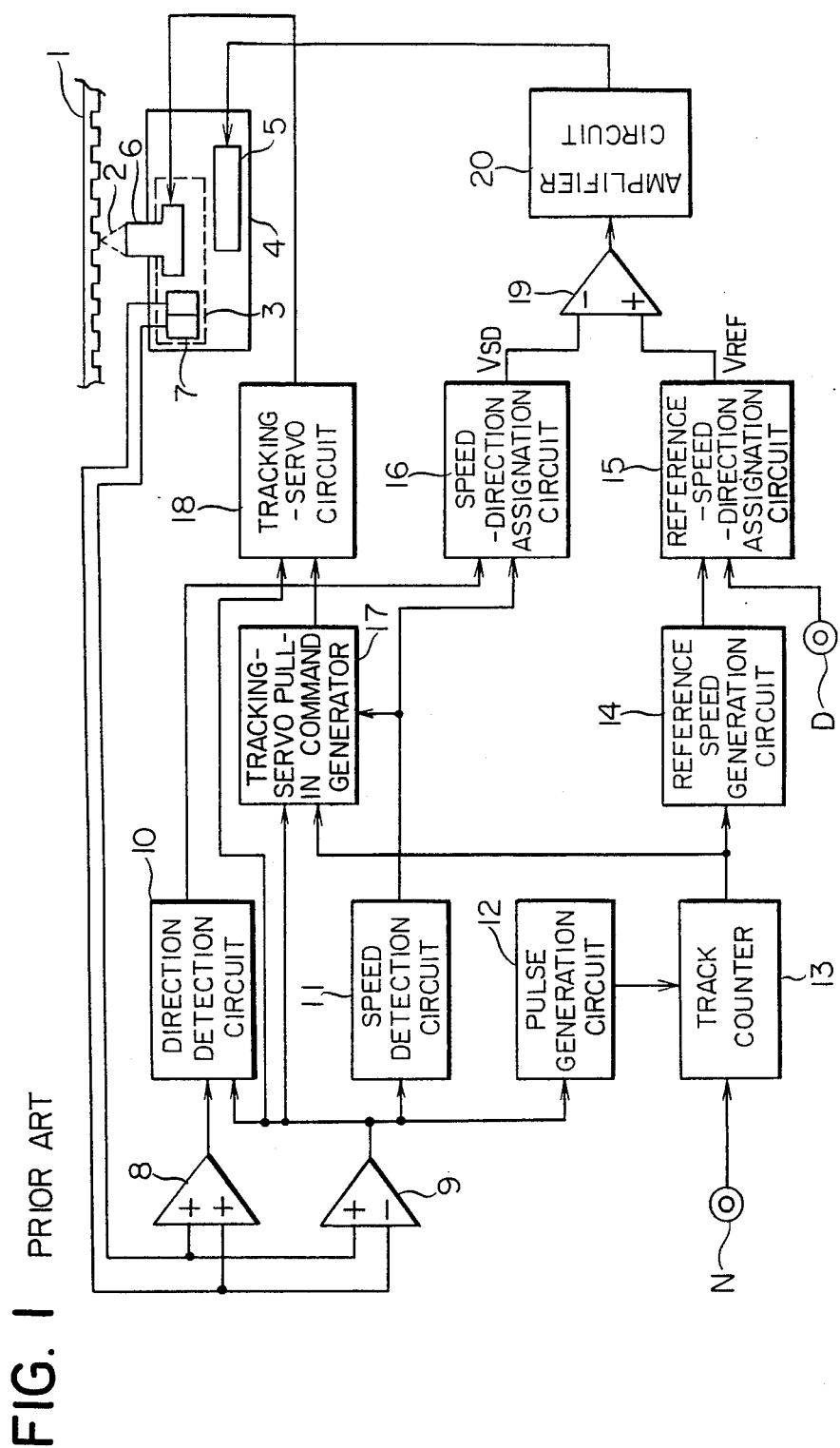
FIG. 1 is a block diagram of a control system of a conventional device for driving and controlling an optical head in an optical disk system.
Figure 2:
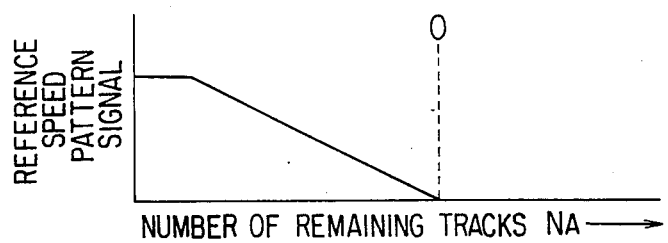
FIG 2. is an input-output characteristic diagram of the reference speed generation circuit shown in FIG 1.
Figure 3:
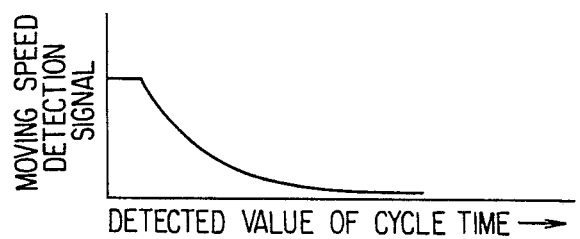
FIG. 3 is an input-output characteristic diagram of the speed detection circuit shown in FIG. 1.
Figure 4:
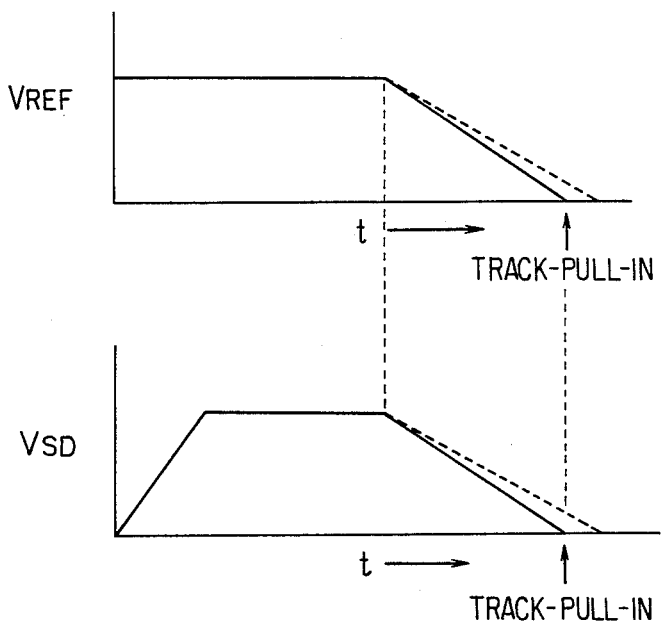
FIG. 4 is a waveform diagram of a reference speed output and a detected speed output obtained in the conventional system.
Figure 5:
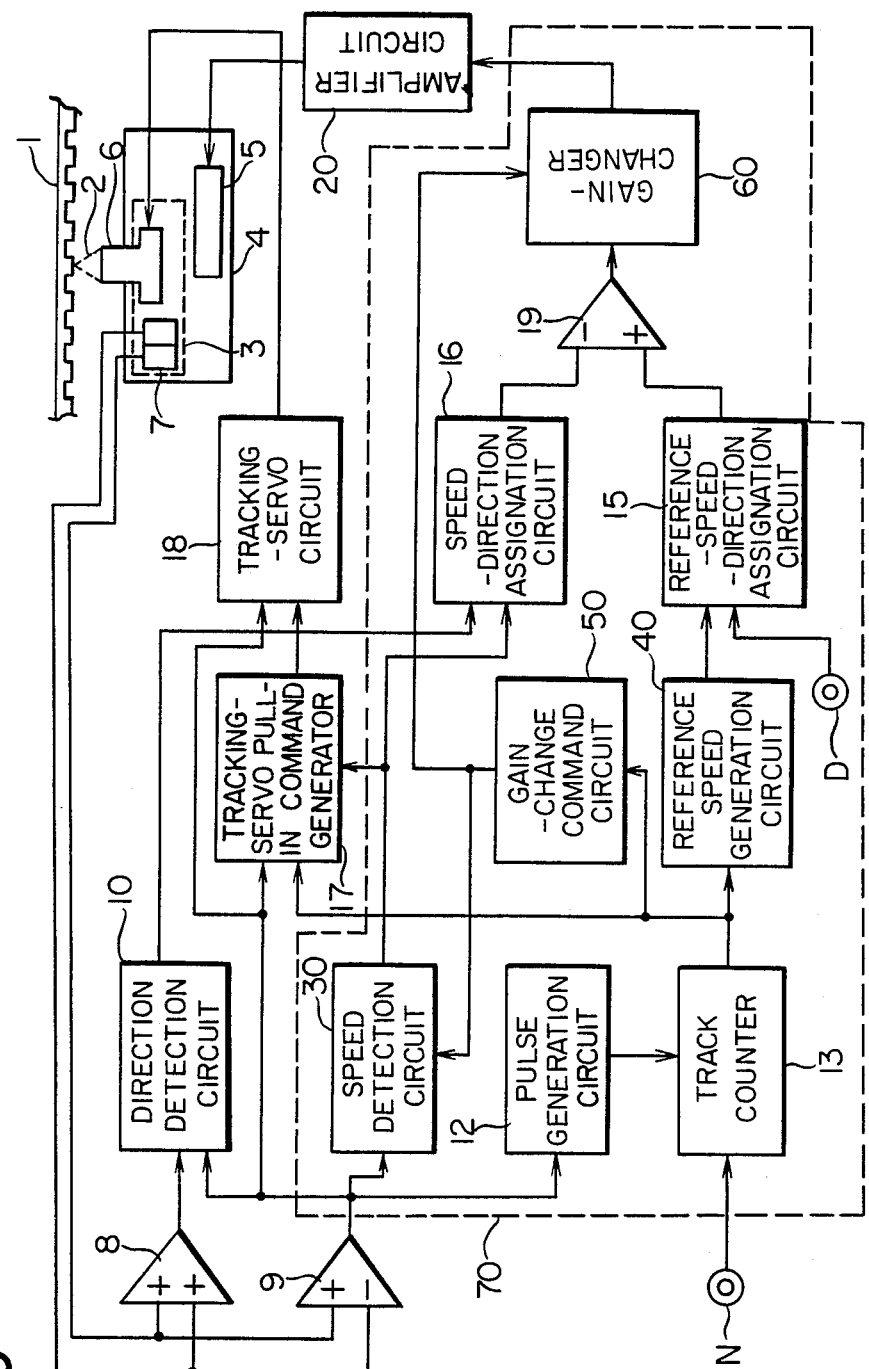
FIG. 5 is a block diagram of a control system of an optical head driving and controlling device which represents an embodiment of the present invention.

An embodiment of the present invention will be described below with reference to the accompanying drawings. FIG. 5 is a block diagram of the control system of an optical head driving and controlling device which represents an embodiment of the present invention. The components 1 to 10, 12, 13, 15 to 20 shown in FIG. 5 are identical to those of the conventional device shown in FIG. 1. In the device in accordance with this embodiment, a speed detection circuit 30 is supplied with the output from the subtraction circuit 9, that is, the differential signal indicative of difference of outputs from the two-divided photo detector 7. The circuit 30 detects the speed at which a spot of the light beam 2 formed on the optical disk 1 moves, and multiplies by several times the speed detection output in accordance with output from a gain-change command circuit, which will be described later, when the number of remaining tracks, that is, the output from the track counter 13, is equal to or smaller than a predetermined value. A reference speed generation circuit 40 generates a reference speed output in accordance with the number of remaining tracks output from the track counter 13 during track access. The reference speed generation circuit 40 also generates an output obtained by multiplying by several times the reference speed output when the number of remaining tracks becomes equal to or smaller than the predetermined value. A gain-change command circuit 50 determines, on the basis of the output from the track counter 13, whether or not the number of remaining tracks becomes smaller than the predetermined value, and outputs a low level if the number of remaining tracks exceeds the predetermined value, or outputs a high level if the number of remaining tracks is equal to or smaller than the predetermined value. A gain-change circuit (gain changer) 60 is provided with two amplifiers having gains $G_1$ and $G_2(G_1 > G_2)$, and uses these amplifiers by changing them over in accordance with the output from the gain-change command circuit 50.

Figure 6:
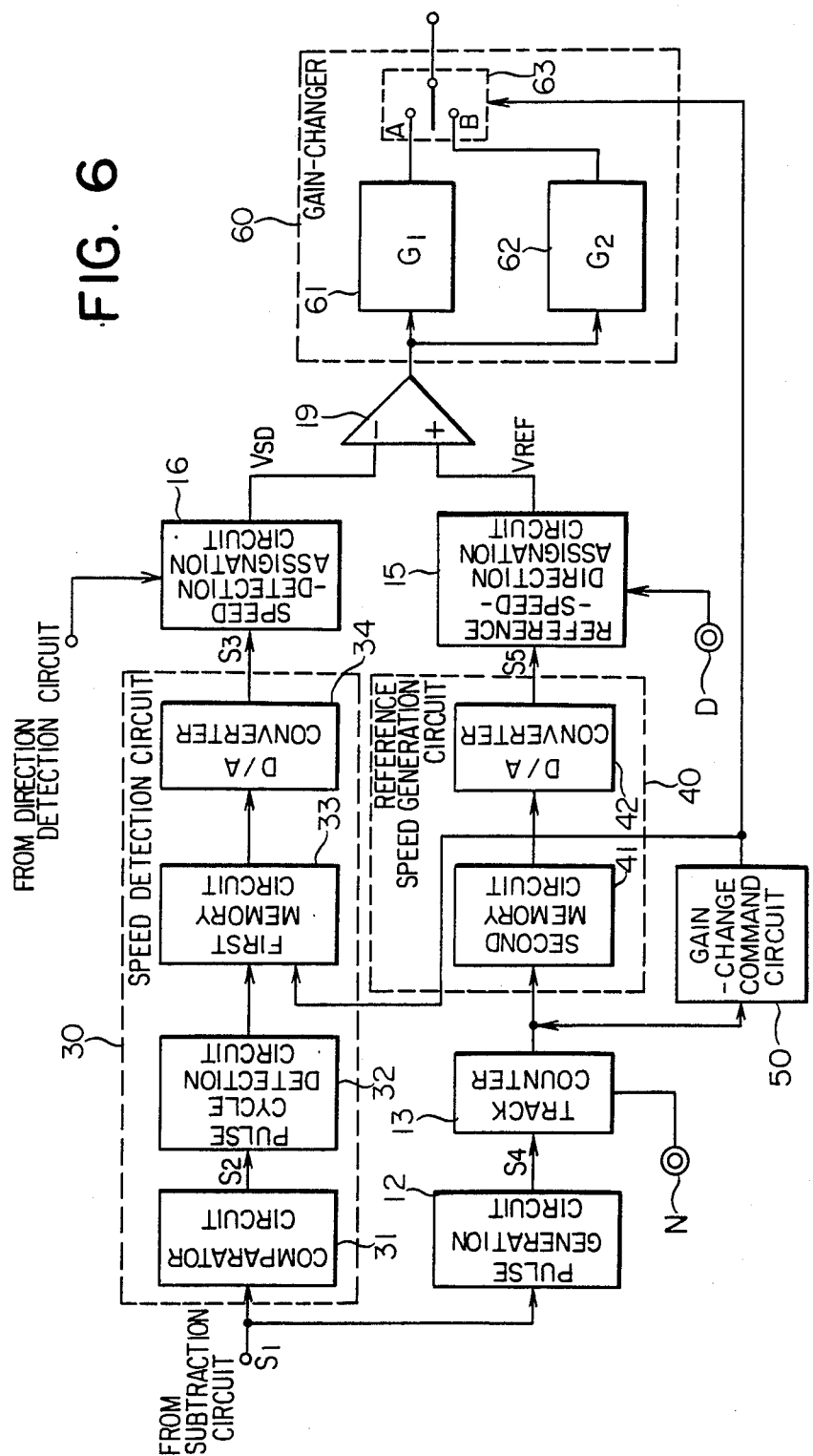
FIG. 6 is a block diagram of details of the essential sections of a speed control system shown in FIG. 5.

FIG. 6. is a block diagram of details of the essential sections of the speed control system indicated by the broken line 70 in FIG. 5. Referring to FIG. 6, a comparator circuit 31 is supplied with a differential signal from the two-divided photo detector 7, that is, the output from the subtraction circuit 9, and converts this signal into a pulse signal. A pulse cycle detection circuit 32 detects a pulse cycle output from the comparator circuit 31 by using a clock at a frequency higher than that defined by this pulse cycle. A first memory circuit 33 is supplied with the number of cycle counts $N_B$ (refer to FIG. 8) which is the pulse cycle detection output from the pulse cycle detection circuit 32. The first memory circuit 33 issues a speed output which is a value in proportion to the reciprocal of the number of cycle counts $N_B$, and issues, in response to the gain-change command when the number of remaining tracks becomes equal to or smaller than the predetermined value, a speed output which is obtained by multiplying by C a value which is in proportion to the reciprocal of the pulse cycle detection output. A D/A converter 34 converts a digital signal supplied as an output from the first memory circuit 33 into an analog signal. The circuits 31 to 34 constitute the speed detection circuit 30. A second memory circuit 41 is supplied with the number of remaining tracks which is output from the track counter 13, outputs a value of the present reference speed, and outputs a value obtained by multiplying by C the previous value when the number of remaining tracks becomes equal to or smaller than the predetermined value. A D/A converter converts a digital signal supplied as an output from the second memory circuit 41 into an analog signal. The circuits 41 and 42 constitute the reference speed generation circuit 40. A first gain amplifier 61 is supplied with the output from the speed error detection circuit 19, and performs amplification at a gain of $G_1$ (amplification factor: $G_1$). A second gain amplifier 62 performs amplification at a gain $G_2$ (amplification factor: $G_2$). A switch 63 operates to select one of the outputs from the first gain amplifier 61 or the second gain amplifier 62 in response to the output from the gain-change command circuit 50. The circuits 61 to 63 constitutes the gain-change circuit 60.

Figure 7:
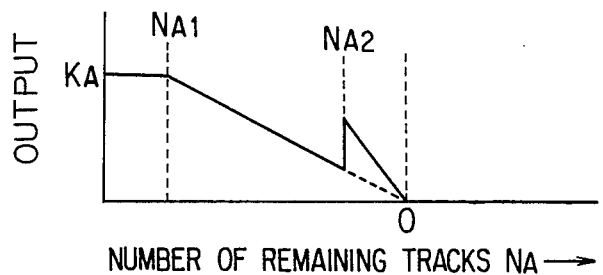
FIG. 7 is an input-output characteristic diagram of a second memory circuit shown in FIG. 5.
Figure 8:
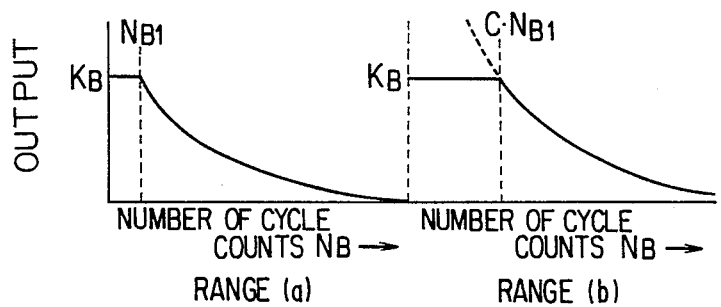
FIG. 8 is an input-output characteristic diagram of a first memory circuit shown in FIG. 5.
Figure 9:
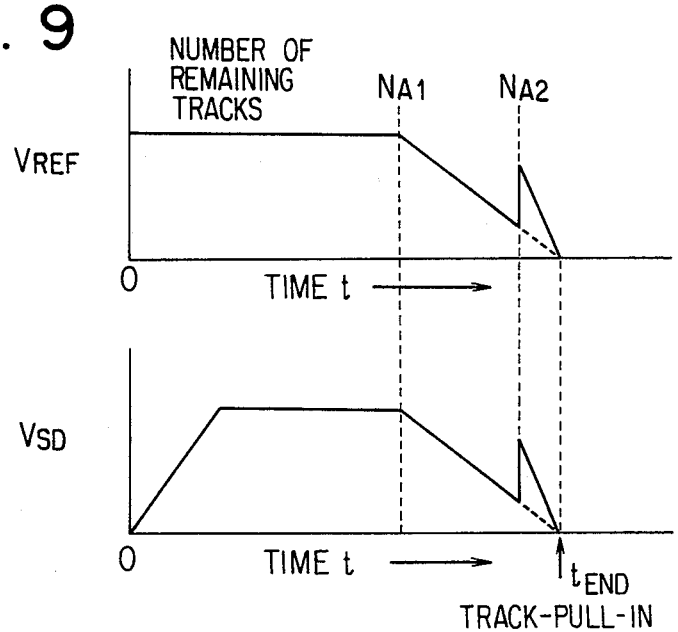
FIG. 9 is a waveform diagram of a reference speed output and a detected speed output in accordance with the present invention.
Figure 10:
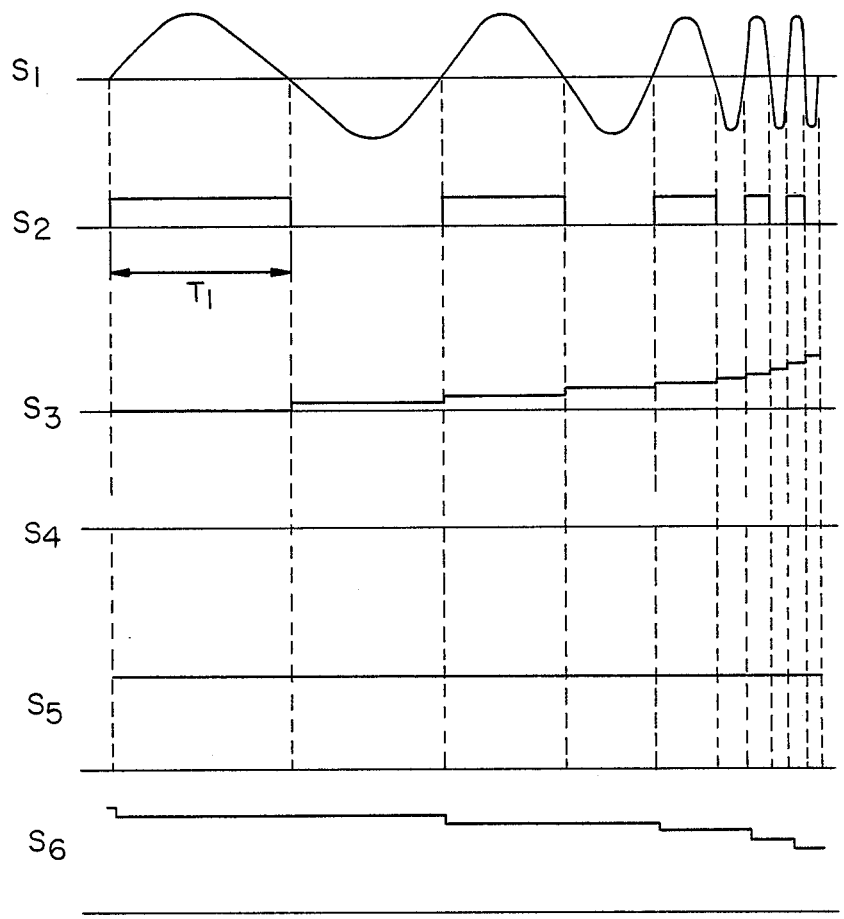
FIG. 10 is a waveform diagram of outputs during operation from sections of the speed control system shown in FIG. 5.

FIG. 7 shows a diagram of the input-output characteristics of the second memory circuit 41 for generating the reference speed output. The second memory circuit 41 is supplied with the number of remaining tracks output from the track counter 13, and outputs $Y_A = K_A$ if the reference speed output is $Y_A$ and if the number of remaining tracks exceeds $N_{A1}$, and outputs $Y_A = F(N_A)$ which shows that the reference speed output decreases gradually, during a period of time in which the number of remaining tracks gradually decreases from $N_{A1}$ and to $N_{A2}$. If the number of remaining tracks becomes equal to or smaller than $N_{A2}$, the second memory circuit 41 outputs a value expressed by $Y_A = C \cdot F(N_A)$ which is C times the function $Y_A$ as between the numbers of remaining tracks $N_{A1}$ to $N_{A2}$. FIG. 8 shows a diagram of the input-output characteristics of the first memory circuit 33 for generating the speed detection output indicative of the transfer speed of the beam spot. The first memory circuit 33 is supplied with the number of cycle counts $N_B$. The number of cycle counts $N_B$ is the output from the operation in which the cycle of the output from the subtraction circuit 9, which has been converted into pulse signals by the comparator circuit 31, is detected by the pulse cycle detection circuit 32 by using a clock having frequency higher than that defined by the cycle of the output from the comparator circuit 31. The first memory circuit 33 has two areas in which data has been stored, and one of these areas is selected by the gain-changed command. In a range (a), an output $Y_B$ of the first memory circuit 33 is $Y_B = K_B$ when the number of cycle counts is smaller than $N_{B1}$, and is $Y_B = F(N_B)/N_B$ when the number of cycle counts is equal to or greater than $N_{B1}$, because the speed is in proportion to the reciprocal of the number of cycle counts. In the range (b), when the number of cycle counts is smaller than $C \cdot N_{B1}$, the first memory circuit 33 also outputs $Y_B = K_B$ in order to output, when the number of cycle counts $N_B$ is small, a value which is C times as high as that obtained in the range (a). When the number of cycle counts exceeds $C \cdot N_{B1}$, the first memory circuit 33 outputs $Y_B = C \cdot F(N_B)/N_B$. Furthermore, as the first and second memory circuits 33 and 41 are digital circuits, the outputs $Y_A$ and $Y_B$ thereof are obtained by, for example, modulating pulse signals in the manner of frequency modulation. The upper graph in FIG. 9 shows the waveform of a reference speed output $V_{REF}$ from the reference-speed-direction assignation circuit 15, in which the abscissa represents the period of time from a seek start point (T=0) to a seek completion point (pull-in point of tracking servo: $t_{END}$), and the ordinate represents the reference speed output $V_{REF}$. The lower graph in FIG. 9 shows the waveform of a speed detection output $V_{SD}$ from the speed-direction assignation circuit 16. The abscissa represents the same period of time as that in the upper graph, and the ordinate represents the speed detection output $V_{SD}$. FIG. 10 is a diagram of waveforms of output signals $S_1$ to $S_2$ from the circuits shown in FIGS. 5 and 6 when the operation of driving the head actuator 5 is started.

The operation in accordance with the present invention will now be described below. From the outputs from the sensors of the two-divided photo detector 7, the addition circuit 8 outputs summation signals (hereinafter referred to as "REF signals") and the subtraction circuit 9 outputs differential signals (hereinafter referred to as "tracking signals"). When the optical head 3 is moved to a target address by the head actuator 5 driven under control, the tracking signal $S_1$ (refer to FIG. 10) is input into the comparator circuit 31 and the pulse generation circuit 12. The comparator circuit 31 compares the tracking signal $S_1$ with a level which is a half of maximum amplitude of the tracking signal $S_1$ so as to output a digital signal $S_2$, and outputs a digital signal $S_4$ by issuing a pulse every track, that is, every cycle (refer to FIG. 10). The output signal $S_4$ supplied from the pulse generation circuit 12 is input into the track counter 13. In the track counter 13, the number of access-tracks N between the target point and the start point input from the outside is reduced every count on the basis of the output signal $S_4$ so that the output from the track counter 13 represents the number of remaining tracks $N_A$ between the beam spot and the target track. The output from the track counter 13 is input into the second memory circuit 41 and into the gain-change command circuit 50. The output from the second memory circuit 41 is issued as the output value $Y_A$ shown in FIG. 7 in accordance with the output from the track counter 13. The gain-change command circuit 50 determines whether or not the number of remaining tracks $N_A$ becomes smaller than $N_{A2}$, outputs, for example, a low-level signal when $N_A > N_{A2}$, and outputs a high-level signal when $N_A \leq N_{A2}$. The output from the second memory circuit is input into the D/A converter circuit 42 and is converted into an analog signal. The signal $S_5$ shown in FIG. 10 represents the output from the D/A converter circuit 42. FIG. 10 is a waveform diagram at the time of commencement of access, and, therefore, the signal $S_5$ is constant at the maximum level, but it decreases as represented by a signal $S_6$ when the spot reaches the vicinity of the target track. The reference-speed-direction assignation circuit 15 is supplied with the output from the second D/A converter 42, and outputs an analog signal to which a polarity necessary for the reference speed output has been imparted in accordance with a moving direction command data D assigned previously. On the other hand, the first memory circuit 33 is supplied with the outputs from the pulse cycle detection circuit 32 and the gain-change command circuit 50, selects and issues, for example, an output such as that defined in the range (a) in FIG. 8 when the output from the gain-change command circuit 50 is low level (when the number of remaining tracks $N_A > N_{A2}$), and issues an output such as that defined in the range (b) in FIG. 8 when the output from the gain-change command circuit 50 is high level (when the number of remaining tracks $N_A \leq N_{A2}$). This operation ensures that the output from the first memory circuit 33 obtained when the number of remaining tracks $N_A \leq N_{A2}$ is C times as high as that obtained when the number of remaining tracks is expressed by $N_A > N_{A2}$. An analog signal $S_3$ (refer to FIG. 10) can be obtained by inputting the output from the first memory 33 into the first D/A converter 34. The output from the direction detection circuit 10 obtained from the difference between the phases of the REF and tracking signals is input into the speed-direction assignation circuit 16, thereby obtaining an analog signal to which a polarity necessary for the speed detection output has been imparted. The output $V_{REF}$ from the reference-speed-direction assignation circuit 15 and the output $V_{SD}$ from the speed-direction assignation circuit 16 are input into the speed error detection circuit 19, thereby detecting a difference $V_{REF} - V_{SD}$. This output is input into the first gain amplifier 61 having the gain $G_1$ and into the second gain amplifier 62 having the gain $G_2$. In this case, the gains $G_1$ and $G_2$ are selected so that $G_1/G_2 = C$. The operation of the switch 63 is performed in such a manner that it is turned to the side A so as to select the output from the first gain amplifier 61 when the output from the gain-change command circuit 50 is low level, that is, the number of remaining tracks $N_A > N_{A2}$, and it is turned to the side B so as to select the output from the second gain amplifier 62 when the output from the gain-change command circuit 50 is high level, that is, the number of remaining tracks $N_A \leq N_{A2}$. The output from the switch 63 is input into the head actuator 5 via the amplifier 20. The speed at which the carriage 4 or the spot of the light beam 2 moves can be controlled by the head actuator 5 in accordance with the reference speed output so that the light beam spot moves to the target track at a high speed. When the spot reaches the target track, the output from the track counter becomes a zero. This output signal and the tracking signal output from the subtraction circuit 9 are input into the tracking servo pull-in command generator 17, so that the tracking servo pull-in command generator 17 issues an output which shows that the track-pull-in point has been detected. When this output signal is input into the tracking-servo circuit 18, the loop of the tracking servo system is formed (this will not be explained) so that the tracking actuator 6 is controlled by the tracking signal so as to lead the spot onto the target track, the spot thereafter following the track. In the thus arranged circuit, the reference speed output $V_{REF}$ and the speed detection output $V_{SD}$ (from the access start to the access completion) changes as indicated in FIG. 9. Immediately after the access start, the amplifier 20 is saturated due to a large value of the output ($V_{REF} - V_{SD}$) from the speed error detection circuit 19, so that the head actuator control speed, that is, the speed at which the spot of the light beam moves, is increased at the maximum acceleration. After the moment at which $V_{REF}$ and $V_{SD}$ become equal to each other, the spot speed is controlled so as to equalize $V_{REF}$ and $V_{SD}$. At the same time, in the gain-changer 60, the first gain amplifier 61 having the gain $G_1$ is selected so as to maintain the necessary loop gain of the speed control circuit. When the number of remaining tracks becomes small as expressed by $N_A \leq N_{A2}$, both the circuit gains of the speed detection circuit 30 and the reference speed generation circuit 40 increase by being multiplied by C. Simultaneously, in the gain-change-over circuit 60, the second gain amplifier 62 having the gain $G_2$ is selected. Since the relationship between $G_1$ and $G_2$ of the gain amplifiers 61 and 62 is $G_2=G_1/C$, the total loop gain of the speed control circuit is the same as that determined when the number of remaining tracks is expressed by $N_A > N_{A2}$.

In the above-described embodiment, the differential signal obtained from the outputs from the two-divided photo detector 7, namely, the tracking signal, is input into the comparator circuit 31 and the pulse generation circuit 12, but the summation signal obtained from the outputs from the two-divided photo detector 7, namely, the REF signal or both the tracking and REF signals are input instead of using the tracking signal only. It is not always necessary to use the outputs from the two-divided photo detector 7 for this purpose. For example, in the case of a sample loop system, the output from a means which detects signals corresponding to the tracking signal (track deviation signal), the REF signal, or the number of tracks over which the spot has moved transversely may be used.

In the above-described embodiment, the gain is changed by determining that the distance between the spot and the target track has become smaller than a certain value. Otherwise, the gain may be changed by determining that the output from the reference speed generation circuit or the speed at which the carriage 4, accommodating the optical head 3, moves (the speed at which the light beam spot moves across the tracks) has become smaller than a certain value, because it is sufficient to reduce the influence of offsets immediately before the head is led to that target track.

In the above-described embodiment, digital signals which represent the target speed and the detection speed are converted into analog signals, and the difference between them is thereafter calculated. Otherwise, the difference may be calculated between the digital signals, thereafter converting the result of this calculation into an analog signal. This operation may be performed in such a manner that values of the target speed and the detection speed are respectively multiplied by C or that the differential signal output from the subtraction circuit 9 is previously multiplied by C and is thereafter multiplied by 1/C in a D/A converter in a subsequent stage or an analog circuit in a further subsequent stage.

In the above-described embodiment, the tracking signal is input into the pulse generation circuit 12, and the output from the pulse generation circuit is input into the track counter 13. However, the output from the comparator 31 may be used instead of the output from the pulse generation circuit 12. In this case, the pulse generation circuit 12 can be reduced.

The above-described embodiment is provided with the separate first and second memories 33 and 41, but one memory circuit may be used instead in such a manner that the outputs from the pulse cycle detection circuit 32 and the track counter 13 are input into the memory in a time-division manner and items of data thereby written in separate areas are read out, thus temporarily storing items of data. The gain-changer 60 in the above-described embodiment is arranged so as to use the pair of gain amplifiers 61 and 62 having the gains of $G_1$ and $G_2$. However, if the gain of one of these amplifiers is 1, this amplifier can, of course, be removed.

The device in accordance with the present invention may otherwise be constructed in such a manner that the tracking actuator 6 is removed and only the head actuator 5 is used to perform tracking.

In the above-described embodiment, the optical head is entirely driven by the head actuator, but the present invention can also be applied to a device such as that using a separate type of head in which only a part of the head is driven.

The head actuator 5 may be a linear motor which moves linearly, or a rotary actuator.

The speed is detected from the light beam reflected on the optical disk 1, but other methods of detecting the speed are possible. For example, a drive current which flows through the head actuator 5 may be detected so that the value thereby detected is used, together with that detected from the light, to calculate the speed more accurately.

In accordance with the present invention, as described above, the levels of the reference-speed and speed-detection outputs are simultaneously increased before the moment at which the track-pull-in operation starts, thereby reducing effects resulting from offsets occurring between the D/A converter and the speed error detection circuit. Therefore, the optical head driving and controlling device in accordance with the present invention has improved functions of controlling the head actuator driving operation and, hence, functions of positioning the head with high accuracy.

What is claimed is:

1. A device for driving and controlling an optical head by forming a spot of a light beam on an optical disk having a plurality of tracks and detecting light from said spot reflected on said optical disk by means of at least one optical detector provided in said optical head, said device comprising:

a head actuator for moving a movable portion of said optical head in the radial direction of said optical disk;

speed detecting means for detecting a track-crossing speed of said spot of said light beam from an output from said optical detector;

reference speed generating means for generating, while access a target track, a reference moving speed signal in accordance with the distance between said spot of said light beam and said target track obtained from said output from said optical detector so that said movable portion of said optical head is moved in such a way that the speed of said movable portion gradually decreases at a position near said target track before said spot of said light beam reaches said target track;

speed error detecting means for obtaining the difference between an output from said reference speed generating means and an output from said speed detecting means, said difference being output from said speed error detecting means after being amplified; and magnification change means adapted for amplifying said outputs from said reference speed generating means and said speed detecting means by a predetermined multiplying factor when the distance between said spot of said light beam and said target track of said crossing speed of said spot becomes smaller than a predetermined value, said magnification change means being also adapted for outputting said difference obtained by said speed error detecting means after multiplying said difference by the reciprocal of said multiplying factor;

wherein said head actuator is driven on the basis of said ouput of said error detecting means so as to control the speed at which said movable portion of said optical head moves.

2. A device for driving and controlling an optical head according to claim 1, wherein said magnification change means changes over said multiplying factor when the number of remaining tracks between said spot of said light beam and said target track obtained by said reference speed generating means becomes equal to or smaller than a predetermined value.

3. A device for driving and controlling an optical head according to claim 1, wherein said magnification change means changes over said multiplying factor by determining that a speed detection signal supplied from said speed detecting means has become equal to or smaller than a predetermined value.

4. A device for driving and controlling an optical head according to claim 1, wherein said mangification change means changes over said multiplying factor by determining that a reference speed signal supplied from said reference speed generation means has become equal to or smaller than a predetermined value.

5. A device for driving and controlling an optical head according to claim 1, wherein said device further comprises a tracking actuator in said optical head and a trackingservo means, said tracking-servo means making said tracking actuator finely adjust the position of said spot of said light beam to said target track and thereafter effect the control of making said movable portion of the optical head follow up said target track after the control of positioning said movable portion of optical head to said optical track by means of said head actuator.

6. A device for driving and controlling an optical head according to claim 5, wherein said magnification change means changes over said multiplying factor when the number of remaining tracks between said spot of said light beam and said target track obtained by said reference speed generating means becomes equal to or smaller than a predetermined value.

7. A device for driving and controlling an optical head according to claim 5, wherein said magnification change means changes over said multiplying factor by determining that a speed detection signal supplied from said speed detecting means has become equal to or smaller than a predetermined value.

8. A device for driving and controlling an optical head according to claim 5, wherein said magnification change means changes over said multiplying factor by determining that a reference speed signal supplied from said reference speed generation means has become equal to or smaller than a predetermined value.

* * * * *